United States Patent
Post

(10) Patent No.: US 8,581,463 B2
(45) Date of Patent: Nov. 12, 2013

(54) MAGNETIC BEARING ELEMENT WITH ADJUSTABLE STIFFNESS

(75) Inventor: Richard F. Post, Walnut Creek, CA (US)

(73) Assignee: Lawrence Livermore National Laboratory, LLC, Livermore, CA (US)

(*) Notice: Subject to any disclaimer, the term of this patent is extended or adjusted under 35 U.S.C. 154(b) by 281 days.

(21) Appl. No.: 13/150,467

(22) Filed: Jun. 1, 2011

(65) Prior Publication Data

US 2011/0291507 A1 Dec. 1, 2011

Related U.S. Application Data

(60) Provisional application No. 61/350,362, filed on Jun. 1, 2010.

(51) Int. Cl.
*H02K 7/09* (2006.01)

(52) U.S. Cl.
USPC .......................... 310/90.5; 310/401

(58) Field of Classification Search
CPC .................. F16C 32/0427; H02K 7/09
USPC .................. 310/90.5, 90, 156.04, 401
See application file for complete search history.

(56) References Cited

U.S. PATENT DOCUMENTS

| 5,386,166 A | * | 1/1995 | Reimer et al. ............... 310/90.5 |
| 5,495,221 A | | 2/1996 | Post |
| 5,729,065 A | * | 3/1998 | Fremery et al. .............. 310/90.5 |

* cited by examiner

*Primary Examiner* — Burton Mullins
*Assistant Examiner* — Michael Andrews
(74) *Attorney, Agent, or Firm* — John P. Wooldridge

(57) ABSTRACT

A compact magnetic bearing element is provided which is made of permanent magnet discs configured to be capable of the adjustment of the bearing stiffness and levitation force over a wide range.

17 Claims, 1 Drawing Sheet

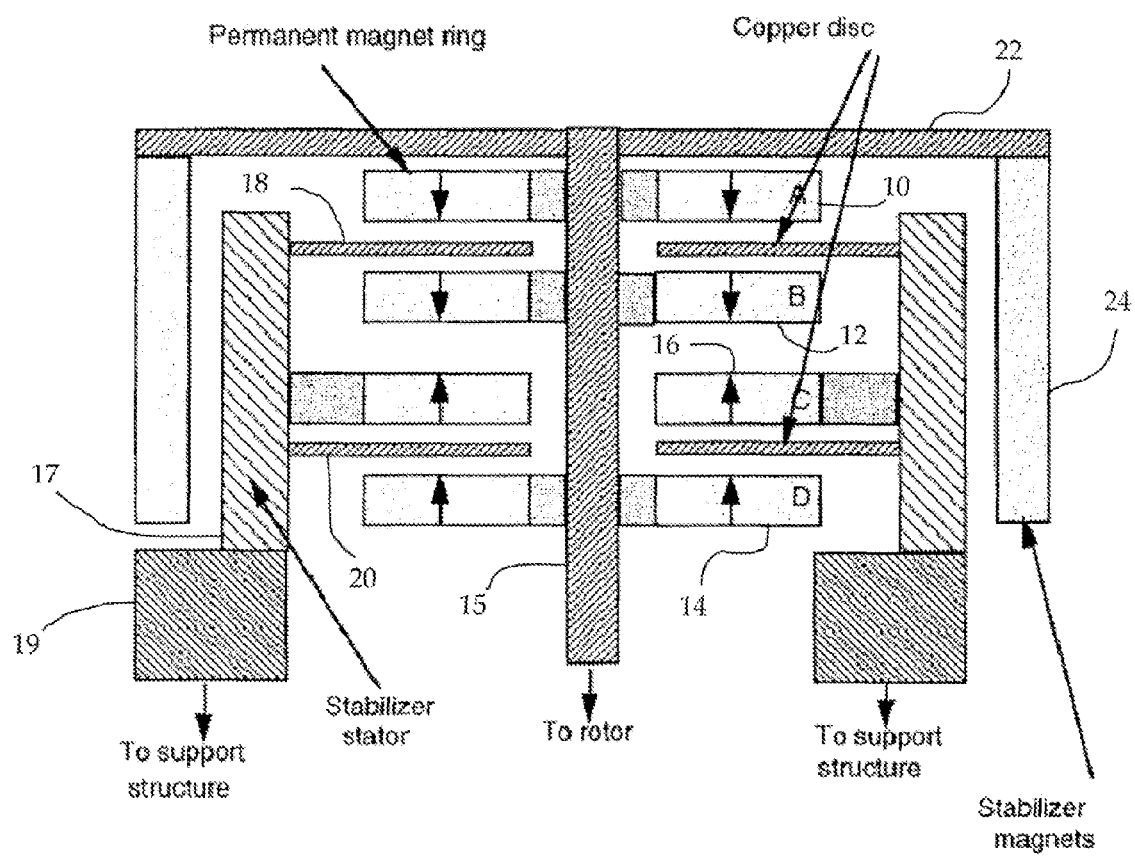

MAGNETIC BEARING ELEMENT WITH ADJUSTABLE STIFFNESS

CROSS-REFERENCE TO RELATED APPLICATIONS

This application claims the benefit of U.S. Provisional Patent Application No. 61/350,362 titled "Magnetic Bearing Element with Adjustable Stiffness," filed Jun. 1, 2010, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to passive magnetic bearings, and more specifically, it relates to techniques for stabilizing such bearings.

2. Description of Related Art

Passive magnetic bearing systems such as those described in U.S. Pat. No. 5,495,221, "Dynamically Stable Magnetic Suspension/Bearing System," incorporated herein by reference, achieve stability by combining different types of bearing elements so that net positive stiffness is achieved for all displacements from equilibrium. In the design of such bearing systems, it would be advantageous to have available levitating elements whose axial and transverse stiffness and levitating forces could be adjusted over a range of values in order to match particular requirements. The present invention provides such levitating elements.

SUMMARY OF THE INVENTION

It is an object of the present invention to provide magnetic bearing elements with adjustable stiffness.

This and other objects will be apparent based on the disclosure herein.

Embodiments of the invention provide a compact magnetic bearing element made of permanent magnet discs configured to be capable of the adjustment of the bearing stiffness and levitation force over a wide range. It can be combined with integral eddy-current dampers and Halbach stabilizers to produce a magnetic bearing system that is stabilized (at operating speeds) against both Earnshawn's theorem structures and whirl-type rotor-dynamic instabilities.

BRIEF DESCRIPTION OF THE DRAWINGS

The accompanying drawing, which is incorporated into and forms a part of the disclosure, illustrates embodiments of the invention and, together with the description, serves to explain the principles of the invention.

FIG. 1 shows a schematic section view of an embodiment of the present combined adjustable stiffness bearing element.

DETAILED DESCRIPTION OF THE INVENTION

This disclosure describes levitating elements whose axial and transverse stiffness and levitating forces are adjustable over a range of values in order to match particular requirements. Such an element consists of a special assembly of permanent magnets, that permits such adjustability. In addition to the levitating function of such a bearing element, it is also necessary in the design of passive magnetic bearings to provide damping means to suppress rotor-dynamic instabilities. The bearing element to be described incorporates eddy-current-based dampers in its design to perform this function when needed.

The concept is illustrated on the attached figure. As shown, the bearing element assembly consists of four annular permanent magnets, with their directions of magnetization oriented as shown. Magnet elements 10, 12, and 14 are attached via a shaft 15 to the rotating element to be levitated, while magnet 16 is attached to stabilizer stator 17 which is attached to a stationary support 19. Between magnets 10 and 12 and between magnets 16 and 14 are positioned thin copper discs 18 and 20, also attached to stabilizer stator 17 which is attached to a stationary support 19. These copper discs provide the damping alluded to above. The damping is provided by resistance to lateral, tilt or whirl instabilities. This resistance occurs between the annular magnets (above and below the disc) and the disc itself. In the design, the spacing between each magnet element and its neighbor (or neighbors) is adjustable. In some embodiments, the adjustment is made on a trial and error basis. For example, as the rotor is rotated, a determination may be made whether an adjustment of the axial and/or transverse stiffness and/or levitating forces should be made. If an adjustment is desired, the rotation is then stopped and the appropriate adjustment is made. The magnet rings are detached from the shaft, moved to the desired spacing and then reattached. In other embodiments, the requisite stiffness and levitation forces are known during the design stage, and therefore the appropriate spacing can he determine and built into the original design. In such cases, the magnet rings do not have to be detachable from the shaft. In still another embodiment, the spacing may be adjustable in real time operation, e.g., through servo mechanisms. It is by varying the spacing that the required variability of both levitating force and transverse/axial stiffnesses is achieved. Magnets 10 and 12 have their magnetization oriented so that their fluxes augment each other. Thus by varying the space between them the strength of the magnetic field below them can be varied. As discussed above, in the gap between them there is placed a thin copper disc to provide damping action, coupling to the flux passing between the two magnets.

Magnets 14 and 16 are also magnetized so that their fluxes add, and as discussed above, between them is located thin copper disc 20 that provides additional damping to that provided by the copper disc between magnets 10 and 12. However magnets 14 and 16 are oriented so as to oppose the flux from magnets 10 and 12, thus there is a repulsion (levitating) force between magnet 12 (rotating) and magnet 16 (stationary). The corresponding stiffnesses are positive (stabilizing) for axial displacements, and negative (destabilizing) for transverse displacements. There also exists an attractive force between magnet 16 (stationary) and magnet 14 (rotating). This attractive force adds vectorially to the levitating force between magnet 16 and magnet 12. However, the stiffnesses are opposite in sign to those of 12-16 pair. The axial stiffness of the 16-14 pair is negative (destabilizing), while the stiffness for transverse displacements is positive (stabilizing).

Given the variability of spacing of bearing elements 10, 12, 14 and 16 from each other it is clear that there will exist a wide range of parameters in both stiffnesses and levitating ability that can be spanned solely by the adjustment of these spacings. Note alternate magnet and copper disc attachment configurations can be made and are within the scope of the present invention. For example, magnets 10, 12 and 14 can be attached to the support structure and magnet 16 can be attached to the shaft. Other configurations will be apparent to those skilled in the art based on the present teachings.

Embodiments of the present bearing element can be combined with a Halbach "stabilizer" of the type described in the cited patent. As shown in the figure, a rotatable support structure 22 is attached to the shaft 15. Stabilizer magnets 24 are attached to the rotatable support structure 22. In some embodiments of the present invention, the stabilizer magnets can be replaced with Halbach arrays and the outer wall of the support structure can be an electrically conductive material (such as Litz wire) such that a repelling force will be generated when the gap between the Halbach arrays and the Litz wire narrows. Alternately, Halbach arrays can be affixed to the outer wall of the stabilizer stator and the stabilizer magnets can be replace with a structure wound with Litz wire. In this way a compact suspension/bearing system can be constructed whose parameters could be adjusted to meet a variety of circumstances.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A magnetic bearing element with adjustable stiffness, comprising
   a rotatable shaft;
   a rotatable support structure attached to said rotatable shaft;
   a stabilizer magnet attached to said rotatable support structure;
   a first magnet attached to said shaft relatively near said rotatable support structure, wherein said first magnet comprises a first direction of magnetization that is in a direction away from said support structure;
   a second magnet attached to said shaft below said first magnet, wherein said second magnet comprises a second direction of magnetization that is the same as said first direction of magnetization, wherein said first magnet is attached to said shaft closer than said second magnet;
   a third magnet attached to said shaft on the opposite side of second magnet relative to said first magnet, wherein said third magnet comprises a third direction of magnetization that is opposite to said first direction of magnetization;
   a stationary support structure;
   a stabilizer stator attached to said stationary support structure;
   a first damping mechanism attached to said stabilizer stator, wherein said first damping mechanism is located between said first magnet and said second magnet, wherein said first damping mechanism provides resistance to lateral, tilt or whirl instabilities of said shaft relative to said stabilizer stator;
   a fourth magnet attached to said stabilizer stator and located between said second magnet and said third magnet, wherein said fourth magnet comprises a fourth direction of magnetization that is the same as said third direction of magnetization, wherein said third direction of magnetization adds to said fourth direction of magnetization to produce a repelling force with respect to said first direction of magnetization and said second direction of magnetization; and
   a second damping mechanism attached to said stabilizer stator, wherein said second damping mechanism is located between said third magnet and said fourth magnet, wherein said second damping mechanism provides resistance to lateral, tilt or whirl instabilities of said shaft relative to said stabilizer stator.

2. The bearing element of claim 1, wherein said rotatable support structure comprises a disc.

3. The bearing element of claim 1, wherein said stabilizer magnet comprises a cylindrical shape or a ring shape.

4. The bearing element of claim 1, wherein said stabilizer stator comprises a cylindrical shape or a ring shape.

5. The bearing element of claim 1, wherein said first magnet comprises a first annular permanent magnet, wherein said second magnet comprises a second annular permanent magnet, wherein said third magnet comprises a third annular permanent magnet and wherein said fourth magnet comprises a fourth annular permanent magnet.

6. The bearing element of claim 1, wherein said first damping mechanism comprises a first electrically conductive disc, wherein said second damping mechanism comprises a second electrically conductive disc.

7. The bearing element of claim 1, further comprising means for stabilizing said stabilizer magnet with respect to said stabilizer rotor.

8. The bearing element of claim 1, wherein said stabilizer magnet comprises a plurality of stabilizer magnets.

9. The bearing element of claim 1, wherein said stabilizer magnet comprises a Halbach array.

10. The bearing element of claim 1, wherein said first damping mechanism comprises a first eddy-current-based damper, wherein said second damping mechanism comprises a second eddy-current-based damper.

11. The bearing element of claim 1, wherein said rotatable shaft is vertically oriented.

12. The bearing element of claim 1, wherein said repelling force comprises a levitating force with respect to said first direction of magnetization and said second direction of magnetization.

13. An apparatus comprising;
   a rotatable shaft;
   a rotatable support structure attached to said shaft;
   a stabilizer magnet attached to said support structure;
   a first magnet, second magnet and third magnet attached in series to said shaft, wherein said first magnet comprises a first magnetization direction, wherein said second magnet comprises a second magnetization direction and wherein said third magnet comprises a third magnetization direction, wherein said first magnetization direction and said second magnetization direction are in the same direction, wherein said third magnetization direction is opposite to said first magnetization direction;
   a stationary support structure;
   a stabilizer stator attached to said stationary support structure; and
   a fourth magnet attached to said stabilizer stator and positioned between said second magnet and said third magnet, wherein said fourth magnet comprises a fourth magnetization direction, wherein said third magnetization direction and said fourth magnetization direction are in the same direction and together provide a repelling force against said first magnet and said second magnet.

14. The apparatus of claim 13, further comprising means for damping lateral, tilt or whirl instabilities of said shaft relative to said stabilizer stator.

15. The apparatus of claim 14, wherein said means for damping comprises an eddy current damper.

16. The apparatus of claim 14, wherein said means for damping comprises a first copper disc attached to said stabilizer stator and a second copper disc attached to said stabilizer stator, wherein said first copper disc is located between said first magnet and said second magnet and wherein said second copper disc is located between said third magnet and said fourth magnet.

17. The apparatus of claim 13, wherein said stabilizer magnet comprises a Halbach array.

\* \* \* \* \*